United States Patent
Baradie et al.

(10) Patent No.: US 7,577,878 B2
(45) Date of Patent: Aug. 18, 2009

(54) METHOD FOR STORING OR TRANSFERRING DATA USING TIME SEQUENCING

(75) Inventors: Sammy Baradie, Munich (DE); Klaus D. McDonald-Maier, Biberach (DE); Albrecht Mayer, Deisenhofen (DE)

(73) Assignee: Infineon Technologies AG (DE)

(*) Notice: Subject to any disclaimer, the term of this patent is extended or adjusted under 35 U.S.C. 154(b) by 861 days.

(21) Appl. No.: 10/490,992

(22) PCT Filed: Sep. 25, 2002

(86) PCT No.: PCT/DE02/03645

§ 371 (c)(1),
(2), (4) Date: Sep. 24, 2004

(87) PCT Pub. No.: WO03/029953

PCT Pub. Date: Apr. 10, 2003

(65) Prior Publication Data

US 2005/0022067 A1    Jan. 27, 2005

(30) Foreign Application Priority Data

Sep. 28, 2001    (DE)    ............... 101 48 109

(51) Int. Cl.
*G06F 11/00* (2006.01)
(52) U.S. Cl. ............................ 714/45
(58) Field of Classification Search ........ 714/45
See application file for complete search history.

(56) References Cited

U.S. PATENT DOCUMENTS

| 5,625,785 | A | 4/1997 | Miura et al. |
| 7,178,133 | B1 * | 2/2007 | Thekkath ............ 717/128 |

FOREIGN PATENT DOCUMENTS

| DE | 44 07 573 | 3/1995 |
| GB | 2 249 644 A | 5/1992 |

OTHER PUBLICATIONS

Baker et al: "A Priority Event Monitor For An Interrupt-Driven Microprocessor", 1991 IEEE, pp. 905-909.
"Trace Synchronization In A Multiprocessor Environment", IBM Technical Disclosure Bulletin, vol. 35, No. 1B, Jun. 1992, pp. 161-162.
Mink et al.: "Multiprocessor Performance-Measurement Instrumentation", 1990 IEEE, pp. 63-75.
"Four-Way Event Trace", IBM Technical Disclosure Bulletin, vol. 32, No. 6B, Nov. 1989, pp. 381-385.

* cited by examiner

*Primary Examiner*—Scott T Baderman
*Assistant Examiner*—Paul F. Contino
(74) *Attorney, Agent, or Firm*—Dickstein, Shapiro, LLP.

(57) ABSTRACT

A method in which data is stored or transferred together with an information message on the basis of which it can be determined in which order, at which time, and/or during which time span, the data concerned has been acquired, stored or transferred.

23 Claims, 2 Drawing Sheets

| Time | State or event | Sequence information | | |
|---|---|---|---|---|
| | | ZS1-1 | ZS1-2 | ZS1-3 |
| t0 | 1 | - | 0 | - |
| t1 | 2 | 1 | - | - |
| t2 | 1 | - | 2 | - |
| t3 | 3 | 3 | 3 | 3 |
| t4 | 4 | 3 | 3 | 3 |
| t5 | 2 | 0 | - | - |
| t6 | 5 | 0 | - | - |
| t7 | 5 | 0 | - | - |
| t8 | 6 | - | 1 | 1 |

Figure 2

| Time | State or event | Sequence information | | |
|---|---|---|---|---|
| | | ZS1-1 | ZS1-2 | ZS1-3 |
| t0 | 1 | - | 0 | - |
| t1 | 2 | 1 | - | - |
| t2 | 1 | - | 2 | - |
| t3 | 3 | 3 | 3 | 3 |
| t4 | 4 | 3 | 3 | 3 |
| t5 | 2 | 0 | - | - |
| t6 | 5 | 0 | - | - |
| t7 | 5 | 0 | - | - |
| t8 | 6 | - | 1 | 1 |

Figure 3

| Entry No. | Sequence information | | |
|---|---|---|---|
| | ZS1-1 | ZS1-2 | ZS1-3 |
| 1 | 0 | 3 | 3 |
| 2 | 0 | 3 | 3 |
| 3 | 3 | 2 | |
| 4 | 3 | | |

METHOD FOR STORING OR TRANSFERRING DATA USING TIME SEQUENCING

FIELD OF THE INVENTION

The present invention relates to data processing systems, and in particular to a method for storing or transferring data in a data processing systems.

BACKGROUND OF THE INVENTION

In numerous embodiment methods such as these have been known for many years and require no further explanation.

A system in which particularly large amounts of data have to be recorded, buffer-stored and are transferred within short time periods is a programmable unit such as a microprocessor, a microcontroller or a signal processor, which has debug resources by means of which trace information can be output, which is used to monitor the processes taking place within the programmable unit.

The debug resources which are contained in programmable units include, for example, so-called on-chip debug support modules or OCDS modules.

These and other debug resources allow the occurrences of states or events (which can be predetermined from outside the programmable unit) to be monitored within the programmable unit, and allow actions which can be predetermined from outside the programmable unit to be carried out or to be initiated when such a state or such an event has occurred.

The states or events whose occurrence can be monitored by the debug resources may, for example but by no means exclusively, comprise:

access by the programmable unit or by specific components of it to specific memory addresses or registers and/or the transfer of specific data within the programmable unit, and/or the state of the instruction pointer.

The actions which the debug resources carry out or initiate on the occurrence of a state or event such as this or of some other state or event may, for example likewise not exclusively, comprise:

signalling of the fact that the condition to be monitored has occurred to a device which is provided outside the programmable unit, reading or editing of the content of specific memory elements or registers, outputting of trace information, that is to say outputting addresses, data and/or control signals which has or have been transferred or used within the programmable unit, to a device which is provided outside the programmable unit, stopping the running of the program, continuing the running of the program in the so-called single step mode, or the CPU in the programmable unit carrying out routines which are used for debugging or emulation of the programmable unit.

The data which is output by the debug resources is output to the external device which predetermines the states and/or events to be monitored by the debug resources and predetermines the actions to be carried out by the debug resources. The external device can use the data supplied to it from the debug resources to trace the processes taking place within the programmable unit and thus to localize faults which have occurred within the programmable unit.

The trace information, which has already been mentioned above and which can be output by the debug resources is of particular interest in this case. The trace information comprises addresses, data and/or control signals which is or are transferred or used on each occurrence of the states and/or events to be monitored or within a certain time before and/or after the occurrence of the states and/or events to be monitored within the programmable unit.

The basic design or that part of a programmable unit which is responsible for the recording, buffer storage and outputting of the trace information is illustrated in FIG. 1.

The arrangement shown in FIG. 1 includes n first buffer stores ZS1-1 to ZS1-n, a control device C which controls the buffer stores ZS1-1 to ZS1-n, and a second buffer store ZS2 which is connected downstream from the first buffer stores ZS1-1 to ZS1-n.

The first buffer stores ZS1-1 to ZS1-n are connected via lines ADS to the devices in the programmable unit which produce, transfer or use the trace information which can be output. The connection is made in such a way that each of the first buffer stores ZS1-1 to ZS1-n is supplied with a quite specific portion of the trace information which can be output, for example:

the buffer store ZS1-1 is supplied with the addresses which are transmitted via a bus which connects the components of the programmable unit to one another, the buffer store ZS1-2 is supplied with the data which is transmitted via the bus which connects the components of the programmable unit to one another, the buffer store ZS1-3 is supplied with the control signals which are transferred between the components in the programmable unit, and the buffer store ZS1-n is supplied with the respective current count of the program counter.

For the sake of completeness, it should be noted that any desired number of first buffer stores may be provided, and in that each buffer store may be supplied with any desired addresses, data and/or control signals.

The control device C is supplied with various addresses, data, control signals, register contents, memory contents, etc. which occur within the programmable unit. The data which is supplied to the control device C may comprise entirely or partially the data which is also supplied to the first buffer stores ZS1-1 to ZS1-n; or alternatively or additionally, this data may, however, also comprise other data or further data. The control device C checks whether the data supplied to it satisfies one or more specific conditions and, by appropriately driving the first buffer stores ZS1-1 to ZS1-n, causes the data supplied to these buffer stores to be stored when one or more of the conditions to be monitored is or are satisfied, with the condition or conditions which is or are satisfied determining whether and if appropriate which first buffer stores ZS1-1 to ZS1-n will store the data supplied to them. In this case, by way of example, it is possible to provide:

for only the buffer store ZS1-1 to store the data supplied to it when a first condition is satisfied, for the buffer store ZS1-1 and the buffer store ZS1-2 to store the data supplied to them when a second condition is satisfied, for all of the buffer stores ZS1-1 to ZS1-n to store the data supplied to them when a first condition is satisfied and a third condition is then satisfied, and/or for none of the buffer stores ZS1-1 to ZS1-n to store the data supplied to them when a first condition and a fourth condition are satisfied at the same time.

The control device C can furthermore also be used to define which addresses, data and/or control signals is or are supplied to the buffer stores ZS1-1 to ZS1-n. For this purpose, the buffer stores ZS1-1 to ZS1-n in FIG. 1 may be preceded by selection devices which are not shown, are controlled by the control device C and in each case always transfer, from a large amount of data which is supplied to them, only a portion of this data, predetermined by the control device C, to the respective buffer stores ZS1-1 to ZS1-n.

In the example under consideration, the buffers stores ZS1-1 to ZS1-n are FIFOs with a relatively small storage capacity. The data which is stored in the buffer stores ZS1-1 to ZS1-n is transferred continuously to the buffer store SZ2, which in the example under consideration is formed by a larger RAM. The data which is stored in the RAM is—if appropriate after the data has been compressed (for example by means of a NEXUS module according to the Standard entitled "The Nexus 5001 Forum Standard for a Global Embedded Processor Debug Interface" defined by the IEEE Industry Standards and Technology, Standards and Technology Organization (IEEE-ISTO) in 1999)— output immediately or later from the programmable unit to the external device. This output data is the trace information which has already been mentioned above.

The external device can use the trace information supplied to it to trace the processes taking place within the programmable unit.

In order to allow the external device to reconstruct the processes taking place within the programmable unit, it obviously also requires information about the sequence and/or the times of recording of the data supplied to it. The external device can determine this information relatively easily itself if the NEXUS module, as already mentioned above, or the like is used for outputting the trace information from the programmable unit. The NEXUS module compresses the data to be output, this reducing the amount of data to be output, and the data can be output immediately after it is recorded, that is to say effectively in real time, from the programmable unit. This makes it possible for the external device to use the sequence and the times of reception of the data supplied to it to determine the information which it requires relating to the sequence and times of recording of the data supplied to it.

This way of determining the additional information required by the external device leads to incorrect results, particularly when the programmable unit outputs so much trace information in a short time that the information can no longer be output in real time.

This in turn means that the external device cannot reconstruct, or no longer accurately reconstruct, the processes taking place within the programmable unit.

SUMMARY OF THE INVENTION

The present invention is therefore directed to a method developed such that the processes taking place within a programmable unit can be determined in detail in all circumstances on the basis of the trace information output from this unit.

The method according to the invention is distinguished in that the data is stored or transferred together with information from which it is possible to determine the sequence in which, the time at which and/or the time period within which the relevant data has been recorded, stored or transferred.

For data which has been stored or transferred at any given time, it is thus possible to determine the sequence in which, the time at which or the time period within which this data was recorded, stored or transferred. This in turn makes it possible to determine in detail the processes taking place within the programmable unit, in all circumstances.

Advantageous developments of the invention can be found in the dependent claims, in the following description and in the figures.

BRIEF DESCRIPTION OF THE DRAWINGS

The invention will be described in more detail in the following text using exemplary embodiments and with reference to the figures, in which:

FIGS. 2 and 3 show illustrations to show how the sequence information that is associated with data to be stored or to be transferred is handled.

DESCRIPTION OF A PREFERRED EXEMPLARY EMBODIMENT

Figure 1:
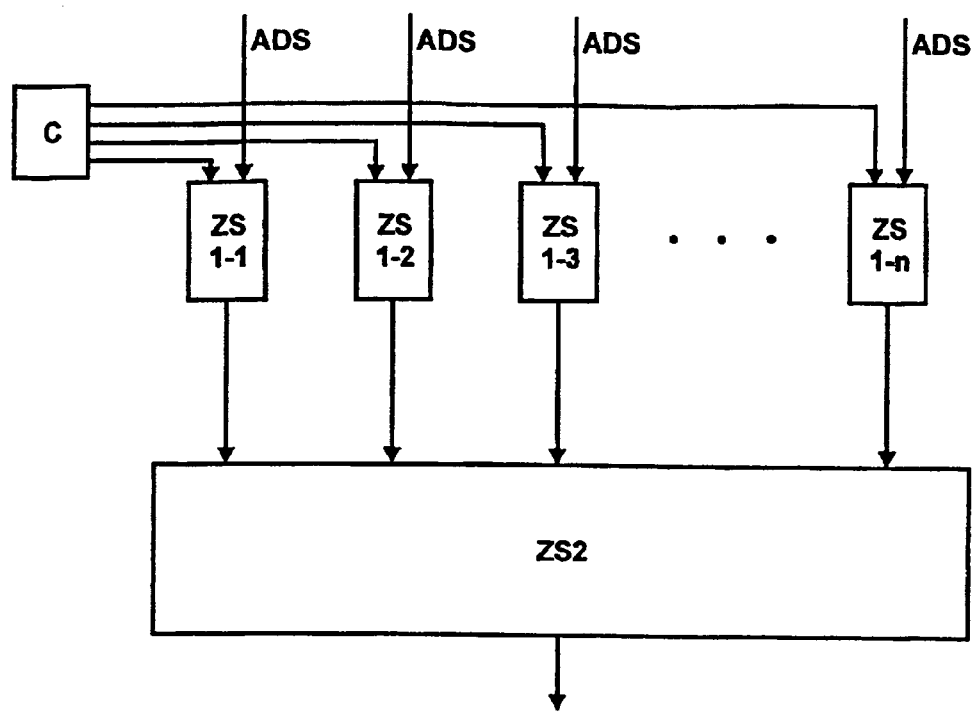
FIG. 1 shows the basic design of a part of a programmable unit which is responsible for recording, buffer storage and outputting of trace information.

The method as described in the following text for storing and transferring data will be described with reference to the buffer storage and transfer of trace information to be output from a programmable unit.

However, it should be mentioned at this point that the method may also be used for storing or transferring any other desired data, and may also be used other than in programmable units.

The devices which are required to carry out the method are, in the example under consideration, a component of the programmable unit which outputs the trace information.

First of all, one possible way will be described by means of which it is possible to ensure that trace information to be output is output from the programmable unit in the sequence in which is was recorded. One possible way will then be described by which the information which has been output from the programmable unit can be used, independently of the time at which the trace information was output, to determine the time or the time period at which or within which the trace information was recorded, buffer-stored or output within the programmable unit.

It should be mentioned at this point that the stated options may be used both individually and in combination with one another.

The method which makes it possible to ensure that trace information to be output is output from the programmable unit in the sequence in which it was recorded can be implemented in the arrangement shown in FIG. 1 and, in an implementation such as this, comprises:

the data which is written to the first buffer stores ZS1-1 to ZS1-n being stored together with information which is referred to in the following text as sequence information, from which it is possible to determine the sequence in which the relevant data was recorded (was written to the first buffer stores ZS1-1 to ZS1-n), the data which is stored in the first buffer stores ZS1-1 to ZS1-n being transferred to the second buffer store ZS2, with the respective sequence information associated with it being evaluated in the sequence in which it was written to the first buffer stores ZS1-1 to ZS1-n, and being stored in this second buffer store ZS2 with the data which was received successively in time being stored at successive addresses, and the data which is stored in the second buffer store ZS2 being output from the programmable unit in the sequence in which it was stored there, directly or via an Nexus module or the like.

For the sake of completeness it should be noted that, in the example under consideration, the data which is output from the first buffer stores ZS1-1 to ZS1-n is output without the sequence information, and that the data which is stored in the second buffer store ZS2 is stored without sequence information, but together with information which is referred to in the following text as data source information and indicates the addresses, data or control signals which the respective data represents (the data source from which it originates).

At this point, it should be noted that the data to be output from the programmable unit can also be output from the programmable unit without first buffer storage in the first buffer stores ZS1-1 to ZS1-n, that the data to be output from the programmable unit can also be output from the programmable unit without second buffer storage in the second buffer store ZS2, that the data to be output from the programmable unit can also be output without any buffer storage, that is to say without buffer storage in the first buffer stores ZS1-1 to ZS1-n and without buffer storage in the second buffer store ZS2, and that the data which is output from the first buffer stores ZS1-1 to ZS1-n and/or the data which is output from the second buffer store ZS2, and/or the data which is output from the programmable unit can be output together with the respective sequence information associated with it, in which case it is also possible to output data that has not been sorted on the basis of the sequence.

The information relating to the sequence may be added by the control device C which, for this purpose, is appropriately modified in comparison to the control device as used for a conventional method.

That part of the control device C which produces the sequence information in the simplest case comprises a counter which is incremented whenever data is written to one of the first buffer stores ZS1-1 to ZS1-n, and whose respective current count is used as the sequence information that is stored together with the relevant data.

When data is being written to two or more of the first buffer stores ZS1-1 to SZ1-n at the same time, the same sequence information is preferably used for the data which is written to the first buffer stores ZS1-1 to ZS1-n at the same time.

It is even better for the count of the counter to be increased only whenever, on the occurrence of a state or event in response to which data must be stored in one or more of the first buffer stores ZS1-1 to ZS1-n, precisely the same first buffer stores are not written to as was the case on the occurrence of the last state or event in response to which data was written to one or more of the first buffer stores ZS1-1 to ZS1-n.

This will be illustrated in more detail in the following text with reference to an example. Let us assume that:

a first state or a first event occurs at a time t0, in response to which data must be written to the first buffer store ZS1-2, a second state or a second event occurs at a time t1, in response to which data must be written to the first buffer store ZS1-1, the first state or the first event occurs at a time t2, that is to say data must be written to the first buffer store ZS1-2, a third state or a third event occurs at a time t3, in response to which data must be written to the first buffer store ZS1-1, ZS1-2 and ZS1-3, a fourth state or a fourth event occurs at a time t4, in response to which data must be written to the first buffer stores ZS1-1, ZS1-2 and ZS1-3, the second state or the second event recurs at a time t5, that is to say data must be written to the first buffer store ZS1-1, a fifth state or a fifth event occurs at a time t6, in response to which data must be written to the first buffer store ZS1-1, the fifth state or the fifth event recurs at a time t7, that is to say data must be written to the first buffer store ZS1-1, and a sixth state or a sixth event occurs at a time t8, in response to which data must be written to the first buffer store ZS1-2 and ZS1-3.

Let us also assume that the counter whose count is used as the sequence information is a modulo-4 counter, that is to say a counter which counts repeatedly from 0 to 3.

Then:

the data which must be written to the first buffer store ZS1-2 as reaction to the state which occurred at t0 or as a reaction to the event which occurred at t0 is stored together with sequence information with the value 0, the data which must be written to the first buffer store ZS1-1 as reaction to the state which occurred at t1 or as a reaction to the event which occurred at t1 is stored together with sequence information with the value 1, the data which must be written to the first buffer store ZS1-2 as reaction to the state which occurred at t2 or as a reaction to the event which occurred at t2 is stored together with sequence information with the value 2, the data which must be written to the first buffer stores ZS1-1, ZS1-2 and ZS1-3 as reaction to the state which occurred at t3 or as a reaction to the event which occurred at t3 is stored together with sequence information with the value 3, the data which must be written to the first buffer stores ZS1-1, ZS1-2 and ZS1-3 as reaction to the state which occurred at t4 or as a reaction to the event which occurred at t4 is likewise stored together with sequence information with the value 3, the data which must be written to the first buffer store ZS1-1 as reaction to the state which occurred at t5 or as a reaction to the event which occurred at t5 is stored together with sequence information with the value 0, the data which must be written to the first buffer store ZS1-1 as reaction to the state which occurred at t6 or as a reaction to the event which occurred at t6 is likewise stored together with sequence information with the value 0, the data which must be written to the first buffer store ZS1-1 as reaction to the state which occurred at t7 or as a reaction to the event which occurred at t7 is likewise stored together with sequence information with the value 0, and the data which must be written to the first buffer stores ZS1-2 and ZS1-3 as reaction to the state which occurred at t8 or as a reaction to the event which occurred at t8 is stored together with sequence information with the value 1.

This is illustrated in FIG. 2.

The storage of this sequence information together with the data to be stored in the first buffer stores ZS1-1 to ZS1-n makes it possible for the data which is stored in the buffer stores ZS1-1 to ZS1-n to be output from these buffer stores in the sequence in which they were written to the first buffer stores ZS1-1 to ZS1-n. This will be described in the following text with reference to an example.

Let us assume that:
the current time is a time between t6 and t7,
data which was written to the first buffer stores ZS1-1 to ZS1-n at the time t2 to t6 is still located in these buffer stores, and
no new data is written to the buffer stores ZS1-1 to ZS1-n during the processes described in the following text.

FIG. 3 shows which entries for the data which is stored in the first buffer stores ZS1-1 to ZS1-3 is associated with what sequence information. In this case, the entry with the lowest number in each case denotes the most recent entry, and the entry with the highest number in each case denotes the oldest entry.

The procedure for outputting the data which is stored in the first buffer stores ZS1-1 to ZS1-3 now comprises the extraction of the sequence information which is associated with the entries in each case having the highest number and the outputting of that data which is associated with the sequence information having the lowest value.

With regard to the example under consideration here, this means that:
the sequence information with the lowest value is first of all determined from the sequence information for the entry 4 in the first buffer store ZS1-1, the sequence information for the entry 3 in the first buffer store ZS1-2, and the sequence information for the entry 2 in the first buffer store ZS1-3, and the data which is associated with this sequence information, that is to say the data which is stored at the entry 3 in the first buffer store ZS1-2 (this data is associated with the sequence information with the lowest value, that is to say 2) is output, the sequence information with the lowest value is then determined from the sequence information for the entry 4 for the first buffer store ZS1-1, the sequence information for the entry 2 for the first buffer store ZS1-2, and the sequence information for the entry 2 for the first buffer store ZS1-3, and the data which is associated with this sequence information, that is to say the data which is stored at the entry 4 for the first buffer store ZS1-1, as well as the data which is stored at the entry 2 for the first buffer store ZS1-2 as well as the data which is stored at the entry 2 for the first buffer store ZS1-3 (all the data has the same associated sequence information) is then output successively, the sequence information with the lowest value is then determined from the sequence information for the entry 3 for the first buffer store ZS1-1, the sequence information for the entry 1 for the first buffer store ZS1-2, and the sequence information for the entry 1 for the first buffer store ZS1-3, and the data which is associated with this sequence information, that is to say the data which is stored at the entry 3 for the first buffer store ZS1-1, as well as the data which is stored at the entry 1 for the first buffer store ZS1-2 as well as the data which is stored at the entry 1 for the first buffer store ZS1-3 (all the data has the same associated sequence information) is then output successively, the data which is stored at the entry 2 for the first buffer store ZS1-1 is then output (the other first buffer stores ZS1-2 and ZS1-3 contain no more data to be output), and the data which is stored at the entry 1 for the first buffer store ZS1-1 is then output (the other first buffer stores ZS1-2 and ZS1-3 contain no more data to be output).

As is evident from the above description, the described procedure means that it is possible to output data which has been written to the first buffer stores ZS1-1 to ZS1-n in the sequence in which it was written to the first buffer stores ZS1-1 to ZS1-n.

The precautions which have to be taken for this purpose require only a very small amount of effort. In particular, if the counter whose count is used as the sequence information is not incremented whenever data is written but only when specific further conditions are satisfied, it is possible to use a counter whose maximum count has a very low value, so that the additional memory space which is required for storing the sequence information is likewise only very small. In the example under consideration, in which the counter only counts repeatedly from 0 to 3, a negligibly small additional amount of memory space is required to store the sequence information, which is only 2 bits.

One procedure, which is not quite as efficient but is still always advantageous, for the incrementation of the counter is for the counter to be incremented every time the state or event in response to which data must be written to one or more of the first buffer stores ZS1-1 to ZS1-n is a different state or a different event to the state or the event in response to whose occurrence data was most recently written to one or more of the first buffer stores ZS1-1 to ZS1-n.

In addition to or as an alternative to storing and/or transferring the data to be output from the programmable unit together with the sequence information, it is also possible for the data to be stored in the first buffer stores ZS1-1 to ZS1-n and/or the data to be stored in the second buffer store ZS2, and/or the data to be output from the programmable unit to be stored or to be output together with information which denotes the time of recording, the time of storage or the time of the output, and which in the following text is referred to as time information.

The time information may include a time related to a fixed reference time or a time related to changing reference times in which case, by way of example, the time of start up or activation of the programmable unit or of a specific component of it may be used as fixed reference time, and in which case, by way of example, the time at which the most recently recorded, stored or output data was recorded, stored or output, or the time at which a specific time has passed since a fixed or changing reference time may be used as a changing reference time.

In some circumstances, there is no need to store and/or to output the sequence information described above when storing and/or outputting data together with time information. This option can be used when the sequence of recording of the data also allows the time information to be determined.

The simplest to implement and the simplest to evaluate is data which is stored or output together with a time related to a fixed reference time. However, in some circumstances, it may be problematic to provide the data with such time information. In particular, this can result in the amount of data to be stored and/or to be output being increased to a very major extent. In order to limit this effect, it is possible to provide only specific data times, for example every n-th data item (n>1) with time information rather than all the data, and/or to provide only on data item with time information within a number of data items which are recorded at the same time, and/or for the time information to have a variable length (and possibly to include a parameter which indicates the length).

The increase in the amount of data to be stored and/or to be output as a result of the time information can be restricted to an even greater extent if the time information includes a time related to the abovementioned or other changing reference times. It is evident and requires no further explanation that the additional amount of data for such time information is considerably less.

In both cases, that is to say both when the time included in the time information is related to a fixed reference point and when the time included in the time information is related to changing reference points, it has been found to be advantageous for capabilities to be provided for signalling to the external device that the time information does not represent the correct time (for example because the counter whose count is used as the time information has overflowed).

There are two possible ways to do this. The first option is for the time information to include one or more bits which are used to signal whether or possibly additionally how many overflows of the counter have taken place in the meantime. The second option is to output a dedicated message, which signals this circumstance, to the external device whenever an overflow has occurred.

It is also possible to provide for the time which is included in the time information to relate generally to the last overflow of the counter or to the last occasion on which a specific count was reached, in which case the overflow or the reaching of the specific count can be signalled either by appropriate bits in the information including the time relating to this, or by a dedicated message.

If there is no need to know the precise time of recording, storage or outputting of the data, it is also possible to provide for only messages which signal the overflowing of the counter or the fact that a specific count has been reached to be output. Messages such as these preferably define equidistant times. Independently of this, the information relating to the time period within which the data transmitted to it was recorded, stored or output is thus in each case available to the external device.

The generation and outputting of messages which signal the overflowing of the counter or the reaching of a specific counter can be achieved very easily. This may be done, for example:

by providing an additional first buffer store ZS1-n+1,
by writing information which signals this situation, together with sequence information, to the additional first buffer store ZS1-n+1 whenever the counter overflows or a specific count is reached,
by the data which is stored in the first buffer stores ZS1-1 to ZS1-n+1 being output to the second buffer store ZS2 in the sequence in which it was written to these buffer stores, and
by the data which is stored in the second buffer store ZS2 being output to the external device in the form of messages, with the information which signals the overflowing of the counter or the reaching of a specific count being sent as a dedicated message.

Irrespective of the details of the practical implementation, the processes taking place in the programmable unit can be determined in detail in all circumstances with relatively little effort in the described manner.

We claim:

1. A method for storing or transferring data, comprising:
storing or transferring the data with information;
evaluating the information to determine sequence information, which indicates the sequence in which the data has been recorded, stored or transferred;
further evaluating the information to determine the time and/or time period when the data was recorded, stored or transferred,
wherein the data comprises trace information representing addresses, data and/or control signals which is or are used or produced within a programmable unit, and
wherein the data is stored in at least one of a plurality of memories, and a count of a counter is incremented when the at least one memory is not the memory in which the most recently stored data was stored, wherein the count represents the sequence information.

2. The method as claimed in claim 1, further comprising incrementing the count of the counter when the state or the event on whose occurrence data is to be stored or transferred differs from the state or the event on whose occurrence the most recently stored or transferred data was stored or transferred.

3. The method as claimed in claim 1, further comprising evaluating the trace information, such that processes executed within the programmable unit can be traced.

4. The method as claimed in claim 3, wherein the addresses, data and/or control signals is or are written together with the sequence information to the at least one of the plurality of memories.

5. The method as claimed in claim 4, further comprising outputting the data that is stored in the at least one memory to a second memory in the sequence in which it was written to the at least one memory.

6. The method as claimed in claim 5, further comprising transmitting the data that is stored in the at least one memory to the second memory, and storing the data in the second memory without the sequence information.

7. The method as claimed in claim 1, wherein the information comprises time information that indicates the time at which or the time period during which the data was recorded, stored or transferred.

8. The method as claimed in claim 7, wherein the time information represents a time with respect to a fixed reference time.

9. The method as claimed in claim 8, wherein the fixed reference time is the start up or activation time of the programmable unit or a component of the programmable unit.

10. The method as claimed in claim 7, wherein the time information represents a time with respect to changing reference times.

11. The method as claimed in claim 10, wherein the reference time is the time at which the most recently stored or transferred data was recorded, stored or transferred.

12. The method as claimed in claim 10, wherein the reference time is the time at which a specific time has passed since a fixed or changing reference time.

13. The method as claimed in claim 7, further comprising using the time information to determine that a specific time period has passed since a fixed or changing reference time.

14. The method as claimed in claim 7, further comprising integrating the data in messages, wherein at least one of the messages contains the data and time information associated with the data.

15. The method as claimed in claim 7, further comprising integrating the data in messages, wherein at least one of the messages is used to store or transfer the time information.

16. The method as claimed in claim 7, further comprising evaluating the trace information, such that the processes executed within the programmable unit can be traced.

17. The method as claimed in claim 7, wherein the addresses, data and/or control signals is or are written together with the time information in each case associated with it or them to at least one memory of a plurality of memories.

18. The method as claimed in claim 7, further comprising writing the addresses, data and/or control signals written to at least one of a plurality of memories, wherein the time information is written to a dedicated first memory.

19. The method as claimed in claim 17, further comprising outputting the data and time information that is stored in the at least one memory to a second memory in the sequence in which they were written to the at least one memory.

20. The method as claimed in claim 19, wherein the data stored in the second memory is output from the programmable unit in the form of messages as the trace information.

21. A method for tracing data values generated in a system, the method comprising:
    identifying a first data group that includes at least one first data value that is generated during a first time period;
    assigning sequence information to the first data group such that each first data value is assigned a first sequence value;
    writing the first data group to a buffer group, which includes at least one of a plurality of buffers, such that each of the at least one first data values is written to a designated buffer of the buffer group;
    identifying a second data group that includes at least one second data value that is generated during a second time period;
    comparing the first and second data groups by identifying the buffers of the plurality of buffers to which the second data values of the second data group have been written; and
    assigning sequence information to each second data value, wherein the sequence information assigned to each second data value has the first sequence value when each and every second data value is written to a corresponding designated buffer of the buffer group, and wherein the sequence information assigned to each second data value has a second sequence value when at least one of (a) any of the second data values is written to a buffer omitted from the buffer group, and (b) any buffer of the buffer group fails to receive at least one second data value.

22. The method according to claim 21, wherein the system further comprises a counter configured to generate the sequence information, and wherein assigning the second sequence value comprises incrementing the counter.

23. The method according to claim 21, further comprising reading the first and second data values from the plurality of buffers in an order determined by the assigned sequence information.

* * * * *